(12) United States Patent
Wang et al.

(10) Patent No.: US 6,969,125 B2
(45) Date of Patent: Nov. 29, 2005

(54) WHEELEND ASSEMBLY WITH DETACHABLE OUTBOARD JOINT

(75) Inventors: Hui Hugh Wang, Ann Arbor, MI (US); Douglas Charles Myers, Canton, MI (US); Norman Szalony, Brighton, MI (US); Michael Walter Hopson, Clinton Township, MI (US); Paul Eugene Beshears, Jr., Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 345 days.

(21) Appl. No.: 10/690,146

(22) Filed: Oct. 21, 2003

(65) Prior Publication Data

US 2005/0082903 A1 Apr. 21, 2005

(51) Int. Cl.[7] .............................................. B60B 35/00
(52) U.S. Cl. ..................................... 301/124.1; 384/537
(58) Field of Search ........................... 301/124.1, 105.1, 301/131, 125, 132; 384/537, 544; 180/256, 259; 192/69.41, 85; 29/898.066, 898.063; 188/17, 382

(56) References Cited

U.S. PATENT DOCUMENTS

| | | | |
|---|---|---|---|
| 1,966,826 A | | 7/1934 | Miller |
| 4,004,838 A | | 1/1977 | Savage |
| 4,340,317 A | | 7/1982 | Heitmann et al. |
| 4,493,388 A | | 1/1985 | Welschof et al. |
| 4,629,028 A | | 12/1986 | Krude et al. |
| 5,486,053 A | | 1/1996 | Beagley et al. |
| 5,536,075 A | * | 7/1996 | Bertetti ..................... 301/105.1 |
| 5,549,514 A | | 8/1996 | Welschof |
| 5,603,554 A | * | 2/1997 | Monroe et al. .......... 301/105.1 |
| 5,782,565 A | * | 7/1998 | Bertetti et al. .............. 384/537 |
| 5,921,633 A | * | 7/1999 | Neibling et al. ............. 301/6.1 |
| 6,022,275 A | | 2/2000 | Bertetti |
| 6,152,825 A | | 11/2000 | Doell |
| 6,170,628 B1 | | 1/2001 | Bigley |
| 6,193,419 B1 | | 2/2001 | Krude et al. |
| 6,196,639 B1 | | 3/2001 | Di Ponio et al. |
| 6,203,441 B1 | * | 3/2001 | Iarrera ........................ 464/182 |
| 6,354,952 B1 | | 3/2002 | Boulton et al. |
| 6,413,008 B1 | | 7/2002 | Van Dest et al. |
| 6,450,585 B1 | | 9/2002 | Kochsiek |
| 6,668,888 B1 | * | 12/2003 | Beesley et al. ............. 152/417 |
| 2002/0044706 A1 | | 4/2002 | Kayama et al. |
| 2002/0106140 A1 | | 8/2002 | Uchman |
| 2003/0044099 A1 | | 3/2003 | Uchman |

* cited by examiner

Primary Examiner—S. Joseph Morano
Assistant Examiner—Frantz F. Jules
(74) Attorney, Agent, or Firm—Brinks Hofer Gilson & Lione

(57) ABSTRACT

A wheel end assembly includes a bearing shaft having a wheel hub mounted onto an outboard end, and a detachable outboard joint mounted onto an inboard end. A wheel bearing is mounted onto the bearing shaft, and includes a knuckle flange having an inner diameter that defines an inboard outer race and an outboard outer race. An inboard inner race and an outboard inner race are supported on the bearing shaft. Bearing elements are positioned between the inner and outer races. An inboard bearing ring is mounted onto the bearing shaft. The inboard bearing ring defines the inboard inner race and includes an engagement portion extending axially inward that engages the detachable outboard joint. The bearing shaft includes a flange portion that supports the inboard bearing ring and the wheel bearing when the outboard joint is removed.

15 Claims, 4 Drawing Sheets

US 6,969,125 B2

WHEELEND ASSEMBLY WITH DETACHABLE OUTBOARD JOINT

FIELD OF INVENTION

The invention relates to a wheel end assembly for a motor vehicle that features a self retained, pre-loaded wheel bearing and a detachable outboard joint which can be removed from the wheel end assembly without allowing the wheel bearing to come apart.

BACKGROUND OF THE INVENTION

In current wheel end designs, an outboard joint includes a stem that is inserted into a hub to transmit rotational power across the wheel end assembly. In these designs, the wheel bearing is not self-retained. Therefore, if the outboard joint is removed from the wheel end assembly, the wheel bearing will fall apart. Additionally, these designs do not eliminate backlash, and therefore, the loads that they can transmit are limited.

Accordingly, there is a need for a wheel end assembly featuring a self retained wheel bearing and a detachable outboard joint, wherein the outboard joint can be removed from the wheel end assembly leaving the wheel bearing intact.

SUMMARY

In meeting the above need and in over coming the limitations of the known designs a wheel end assembly is provided having a bearing shaft with an inboard end and an outboard end. A wheel hub is mounted onto the outboard end of the bearing shaft, and a detachable outboard joint is mounted onto the inboard end of the bearing shaft. A wheel bearing is mounted onto the bearing shaft between the inboard end and the outboard end. The wheel bearing includes a knuckle flange having an inner diameter that defines an inboard outer race and an outboard outer race. An inboard inner race and an outboard inner race are supported on the bearing shaft. The wheel bearing includes a plurality of bearing elements. A portion of the bearing elements are positioned between the inboard outer race and the inboard inner race. The remaining bearing elements are positioned between the outboard outer race and the outboard inner race. The inboard inner race is formed within an inboard bearing ring. The inboard bearing ring includes an engagement portion extending axially inward that engages the detachable outboard joint. The inboard end of the bearing shaft includes a flange portion that provides a support to keep the inboard bearing ring and the wheel bearing positioned onto the bearing shaft. The flange portion also induces a pre-load into the wheel bearing such that the pre-load is maintained on the wheel bearing when the outboard joint is removed from the wheel end assembly.

In one aspect the outboard joint includes a bell housing having a narrowed neck portion that defines a bell housing inner surface having a polygon shape. The engagement portion of the inboard bearing ring includes an outer surface having a polygon shape corresponding to the bell housing inner diameter. The bell housing engages the engagement portion of the inboard bearing ring and rotationally locks the bell housing and the inboard bearing ring to one another.

In yet another aspect, the polygonal shaped bell housing inner surface and the polygonal shaped outer surface of the inboard bearing ring are tapered along a longitudinal axis of the wheel end assembly.

In still another aspect, the polygonal shaped bell housing inner surface and the polygonal shaped outer surface of the inboard bearing ring are helically shaped-relative to a longitudinal axis of the wheel end assembly.

Additional features, benefits, and advantages will become apparent to those skilled in the art to which the invention relates, from a review of the subsequent description and the appended claims, taken in conjunction with the accompanying drawings.

DETAILED DESCRIPTION

Figure 1:
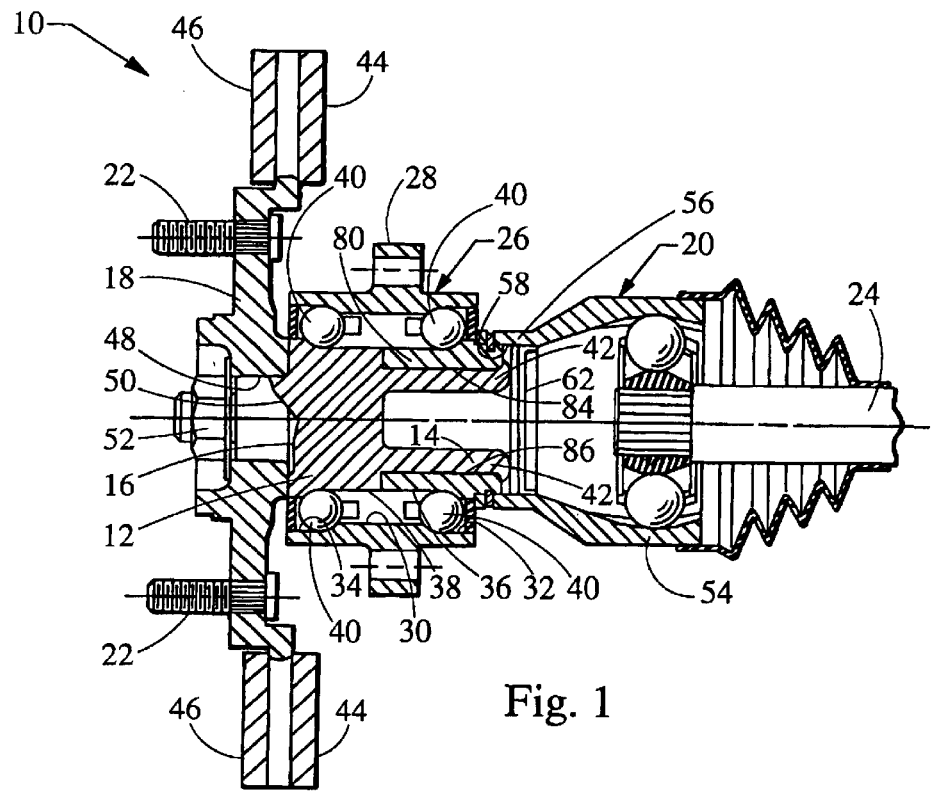
FIG. 1 is a side sectional view of a wheel end assembly.
Figure 2:
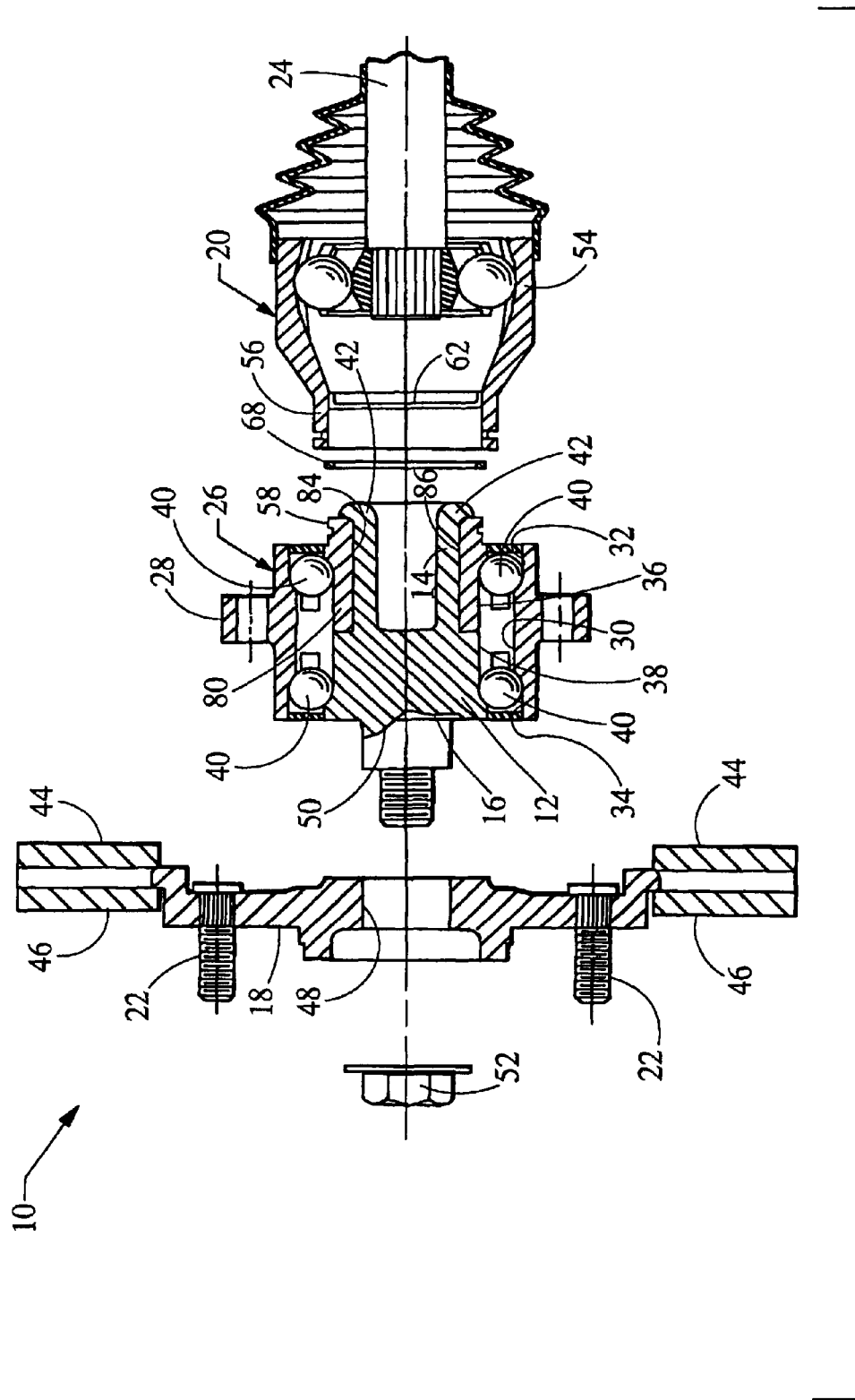
FIG. 2 is an exploded sectional view of the wheel end assembly shown in FIG. 1.

Referring to FIGS. 1 and 2, a wheel end assembly for a motor vehicle is shown generally at 10. The wheel end assembly 10 includes a bearing shaft 12 having an inboard end 14 and an outboard end 16. A wheel hub 18 is mounted to the outboard end 16 of the bearing shaft 12 and a detachable outboard joint 20 is mounted onto the inboard end 14 of the bearing shaft 12.

A plurality of wheel studs 22 extend from the wheel hub 18. The wheel studs 22 are adapted to engage a wheel (not shown) and support the wheel on the wheel hub 18. The outboard joint 20 connects an axle half shaft 24 to the wheel end assembly 10 such that rotational movement is transferred through the axle half shaft 24 to the wheel end assembly 10. The outboard joint 20 is a joint that is adapted to allow angular deflection between the wheel end assembly 10 and the axle half shaft 24, such as a constant velocity joint.

A wheel bearing 26 is mounted on the bearing shaft 12, between the inboard end 14 and the outboard end 16, to rotatably support the wheel end assembly 10 on the structure (not shown) of the vehicle. The wheel bearing 26 includes a knuckle flange 28 that is adapted to connect the wheel end assembly 10 to the structure (not shown) of the vehicle. The knuckle flange 28 has an inner diameter 30 that defines an inboard outer race 32 and an outboard outer race 34.

The bearing shaft 12 supports an inboard inner race 36 and an outboard inner race 38. A shown in FIGS. 1 and 2, the outboard inner race 38 is integrally formed within the bearing shaft 12. Referring to FIGS. 1–5, the inboard inner race 36 is integrally formed within an inboard bearing ring 80. The inboard bearing ring 80 also includes an engagement portion 82 that extends axially and engages the outboard joint 20. As shown, the inboard bearing ring 80 includes a splined inner diameter 84 and the bearing shaft 12 includes a splined outer diameter 86. The spline of the inboard bearing ring 80 engages the spline of the bearing shaft 12 such that the inboard bearing ring 80 is rotationally locked onto the bearing shaft 12. Alternatively, the spline can be absent from the bearing shaft 12 wherein the spline of the inner diameter 84 of the inboard bearing ring 80 is press fit onto the outer diameter 86 of the bearing shaft 12, thereby rotationally locking the inboard bearing ring 80 onto the bearing shaft 12.

A plurality of bearing elements 40 are positioned within the wheel bearing 26. A first portion of the bearing elements 40 are positioned between the inboard outer race 32 and the inboard inner race 36 and a second portion of the bearing elements 40 are positioned between the outboard outer race 34 and the outboard inner race 38. The bearing elements 40 allow the bearing shaft 12 to rotate relative to the knuckle flange 28, thereby rotatably supporting the wheel end assembly 10 within the vehicle. The bearing elements 40 can be ball bearings, tapered bearings, or other suitable bearing elements, depending on the particular application.

The inboard end 14 of the bearing shaft 12 includes a flange portion 42. The flange portion 42 engages the inboard bearing ring 80 to provide a support for the wheel bearing 26 thereby keeping the wheel bearing 26 positioned on the bearing shaft 12 and Inducing a pre-load into the wheel bearing 26. The flange portion 42 is formed by swagging a portion of the bearing shaft 12 over and against the inboard bearing ring 80. The flange portion 42 maintains a pre-load on the wheel bearing 26 when the outboard joint 20 is removed from the wheel end assembly 10.

The wheel hub 18 includes a brake rotor 44 having a braking ring 46 mounted thereon. As illustrated, the braking ring 46 and the brake rotor 44 are integrally formed with one another.

The wheel hub 18 includes a polygonal shaped inner bore 48 and the outboard end 16 of the bearing shaft 12 includes a correspondingly shaped polygonal hub 50 extending therefrom. The polygonal hub 50 of the bearing shaft 12 fits within the polygonal shaped bore 48 of the wheel hub 18 to rotationally lock the wheel hub 18 to the bearing shaft 12. A threaded fastener 52 axially secures the wheel hub 18 to the bearing shaft 12. Alternatively, the wheel hub 18 and the bearing shaft 12 can be integrally formed with one another as a single component.

The outboard joint 20 includes a bell housing 54 having a narrowed neck portion 56 defining a bell housing inner surface 58. The bell housing inner surface 58 has a polygon shape and the engagement portion 82 of the inboard bearing ring 80 includes an outer surface 60 that has a corresponding polygon shape. The bell housing inner surface 58 engages the outer surface 60 of the inboard bearing ring 80 and is rotationally locked to the inboard bearing ring 80. A seal 62 prevents contamination from entering the constant velocity joint.

Figure 3:
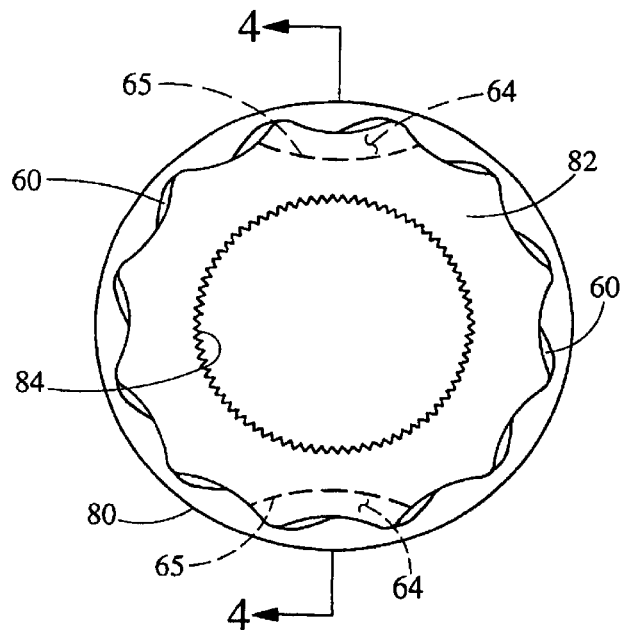
FIG. 3 is an end view of an inboard bearing ring.
Figure 4:
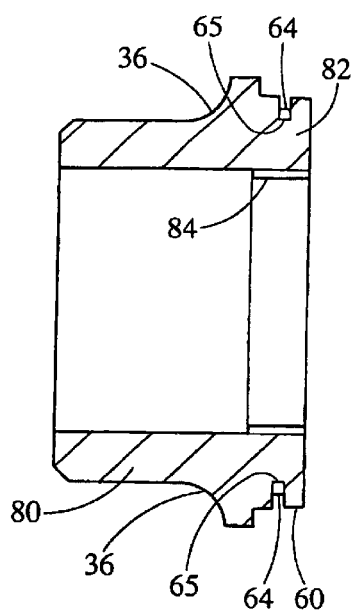
FIG. 4 is a sectional view taken along line 4—4 of FIG. 3.
Figure 5:
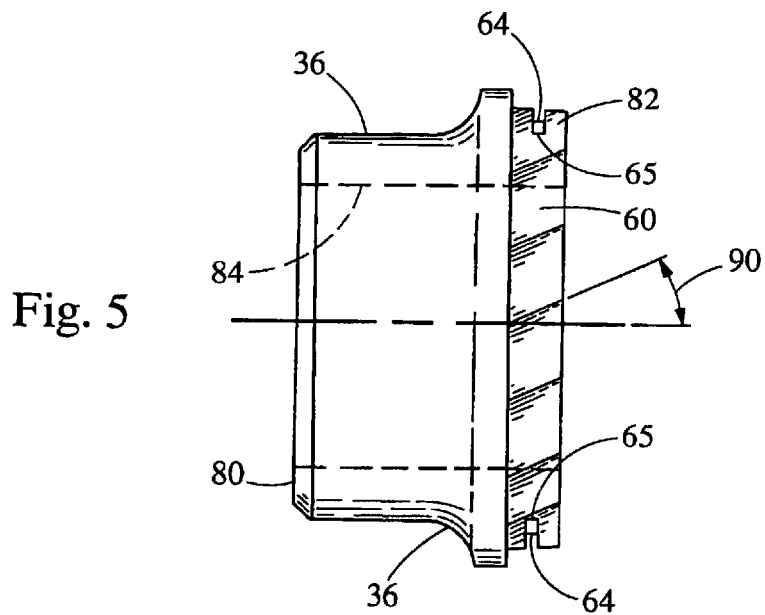
FIG. 5 is a side view of the inboard bearing ring shown in FIGS. 3 and 4.
Figure 6:
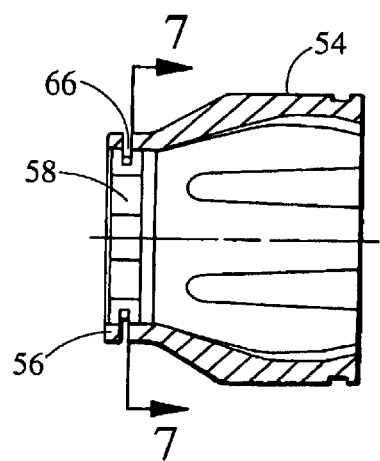
FIG. 6 is a side sectional view of a bell housing of the wheel end assembly having a pair of windows formed therein for receiving a clip.
Figure 7:
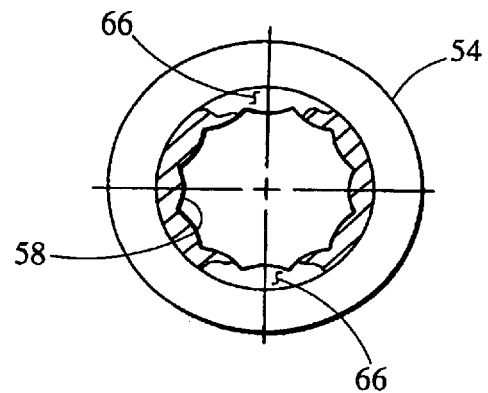
FIG. 7 is a sectional view taken along line 7—7 of FIG. 6.
Figure 8:
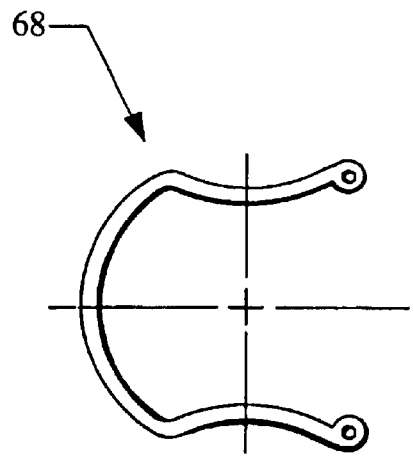
FIG. 8 is a perspective view of a clip of the wheel end assembly.

A notch 64 extends circumferentially around a portion of the polygon shaped outer surface 60 of the inboard bearing ring 80. Referring to FIGS. 3–5, the notch 64 includes two curved grooves 65 cut into the polygon shaped outer surface 60 of the inboard bearing ring 80 and located approximately one hundred and eighty degrees apart. Referring to FIGS. 6 and 7, the bell housing 54 includes at least one window 66 formed within the narrowed neck 56. As shown, the bell housing 54 includes two-curved windows 66 located approximately one hundred and eighty degrees apart and corresponding to the curved grooves 65 of the notch 64. A retaining clip 68, shown in FIG. 8, is inserted through the windows 66 and engages the notch 64 to secure the bell housing 54 to the inboard bearing ring 80. To remove the bell housing 54 from the inboard bearing ring 80, the retaining clip 68 must be removed.

Figure 9:
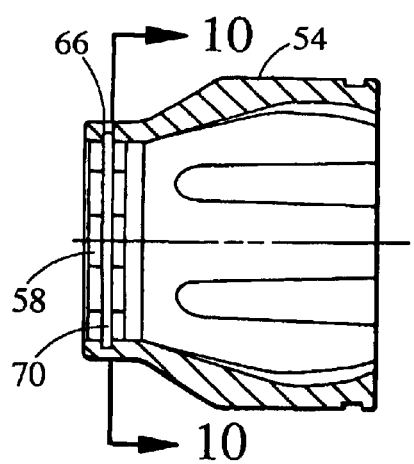
FIG. 9 is a side sectional view of a bell housing of the wheel end assembly having a groove formed therein for receiving a ring.
Figure 10:
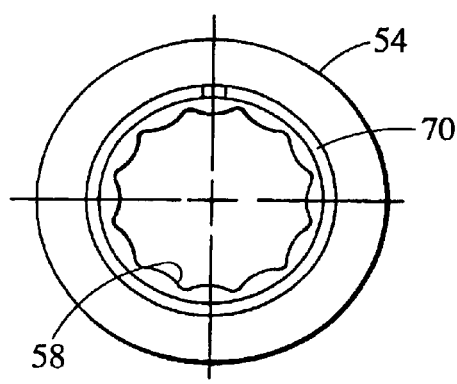
FIG. 10 is a sectional view taken along line 10—10 of FIG. 9.
Figure 11:
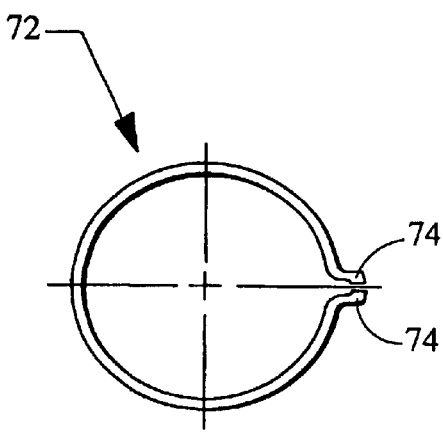
FIG. 11 is a perspective view of a ring of the wheel end assembly.

Alternatively, the bell housing 54 can include a groove 70 extending around the bell housing inner surface 58, as shown in FIGS. 9 and 10. A retaining ring 72, shown in FIG. 11, is positioned within the groove 70 within the bell housing 54 and engages the groove 70 and the notch 64 of the inboard bearing ring 80 to secure the bell housing 54 to the inboard bearing ring 80. To remove the bell housing 54 from the inboard bearing ring 80, tangs 74 on the retaining ring 72 must be spread apart, such that the retaining ring 72 opens to a diameter larger than the notch 64 of the inboard bearing ring 80. This allows the retaining ring 72 to clear the notch 64 so the bell housing 54 can be removed.

Additionally, the polygonal shaped bell housing inner surface 58 and the polygonal shaped outer surface 60 of the inboard bearing ring 80 may be formed as a helix, at an angle 90 relative to a longitudinal axis of the wheel end assembly 10, as shown in FIG. 5. The helical shape will cause the polygonal shaped inner surface 58 of the bell housing 54 to engage the polygonal shaped outer surface 60 of the inboard bearing ring 80 in a screw like manner, such that the normal rotation of the wheel hub 18 acts to cause the bell housing 54 to remain in engagement with said inboard bearing ring 80, and reduces backlash between the two components.

The foregoing discussion discloses and describes the preferred embodiments of the invention. These embodiments have been described in an illustrative manner, and it is to be understood that the terminology which has been used is intended to be in the nature of words of description rather than of limitation. One skilled in the art will readily recognize from such discussion, and from the accompanying drawings and claims, that changes and modifications can be made without departing from the scope of the invention as defined in the following claims.

We claim:

1. A wheel end assembly comprising:
   a bearing shaft having an inboard end and an outboard end;
   a wheel hub mounted onto said outboard end of said bearing shaft;
   a detachable outboard joint mounted onto said inboard end of said bearing shaft; and
   a wheel bearing mounted onto said bearing shaft between said inboard end and said outboard end, said wheel bearing including a knuckle flange having an inner diameter that defines an inboard outer race and an outboard outer race, an inboard inner race and an outboard inner race supported on said bearing shaft, and a plurality of bearing elements, a first portion of said bearing elements being positioned between said inboard outer race and said inboard inner race and a second portion of said bearing elements being positioned between said outboard outer race and said outboard inner race; and
   an inboard bearing ring, said inboard inner race being formed within said inboard bearing ring, said inboard bearing ring including an engagement portion extending axially inward and engaging said detachable outboard joint;

said inboard end of said bearing shaft including a flange portion, said flange portion providing a support to keep said inboard bearing ring, and said wheel bearing positioned onto said bearing shaft and inducing a pre-load into said wheel bearing such that said pre-load is maintained on said wheel bearing when said outboard joint is removed from said wheel end assembly.

said outboard joint including a bell housing, said bell housing having a narrowed neck portion defining a bell housing inner surface, said bell housing inner surface having a polygon shape, said engagement portion of said inboard bearing ring presenting an outer surface having a polygon shape corresponding to said inboard bearing ring and rotationally locks said bell housing and said inboard bearing ring to one another.

2. The wheel end assembly of claim 1 wherein said outboard inner race is integrally formed within the bearing shaft.

3. The wheel end assembly of claim 1 wherein said wheel hub includes a brake rotor having a braking ring, said braking ring and said brake rotor being integrally formed with one another.

4. The wheel end assembly of claim 1 wherein said wheel hub and said bearing shaft are integrally formed with one another.

5. The wheel end assembly of claim 1 wherein said polygonal shaped bell housing inner surface and said polygonal shaped outer surface of said inboard bearing ring are tapered along a longitudinal axis of said wheel end assembly.

6. The wheel end assembly of claim 1 wherein said polygonal shaped bell housing inner surface and said polygonal shaped outer surface of said inboard bearing ring are helical relative to a longitudinal axis of said wheel end assembly.

7. The wheel end assembly of claim 1 wherein a notch extends circumferentially around a portion of said polygon shaped outer surface of said inboard bearing ring, and said bell housing includes at least one window formed within said narrowed neck portion, said wheel end assembly further including a retaining clip inserted through said at least one window and engaging said notch of said bearing shaft to secure said bell housing to said bearing shaft.

8. The wheel end assembly of claim 1 wherein a notch extends circumferentially around a portion of said polygon shaped outer surface of said inboard bearing ring, and a groove extends around said bell housing inner surface, said wheel end assembly further including a retaining ring positioned within said groove within said bell housing, said retaining ring engaging said groove and said notch of said inboard bearing ring to secure said bell housing to said bearing shaft.

9. The wheel end assembly of claim 1 wherein said inboard bearing ring includes a splined inner diameter that engages said bearing shaft such that said inboard bearing ring is rotationally locked onto said bearing shaft.

10. A wheel end assembly comprising:
a bearing shaft having an inboard end and an outboard end;
a wheel hub mounted onto said outboard and of said bearing shaft
a detachable outboard joint mounted onto said inboard end of said bearing shaft, said outboard joint including a bell housing, said bell housing having a narrowed neck portion defining a bell housing inner surface, said bell housing inner surface having a polygon shape;

a wheel bearing mounted onto said bearing shaft between said inboard end and said outboard end, said wheel bearing including a knuckle flange having an inner diameter that defines an inboard outer race and an outboard outer race, an inboard inner race and an outboard inner race supported on said bearing shaft, and a plurality of bearing elements, a first portion of said bearing elements being positioned between said inboard outer race and said inboard inner race and a second portion of said bearing elements being positioned between said outboard outer race and said outboard inner race; and an inboard bearing ring, said inboard inner race being formed within said inboard bearing ring, said inboard bearing ring including an engagement portion extending axially inward and engaging said detachable outboard joint, said engagement portion of said inboard bearing ring presenting an outer surface having a polygon shape corresponding to said polygon shaped bell housing inner surface such that said bell housing engages said inboard bearing ring and rotationally locks said bell housing and said inboard bearing ring to one another;

said inboard end of said bearing shaft including a flange portion, said flange portion providing a support to keep said inboard bearing ring, and said wheel bearing positioned onto said bearing shaft and inducing a pre-load into said wheel bearing such that said pre-load is maintained on said wheel bearing when said outboard joint is removed from said wheel end assembly.

11. The wheel end assembly of claim 10 wherein said outboard inner race is defined by an outer surface of said bearing shaft.

12. The wheel end assembly of claim 10 wherein said wheel hub includes a brake rotor having a braking ring, said braking ring and said brake rotor being integrally formed with one another.

13. The wheel end assembly of claim 10 wherein said wheel hub and said bearing shaft are integrally formed with one another.

14. The wheel end assembly of claim 10 wherein a notch extends circumferentially around a portion of said polygon shaped outer surface of said inboard bearing ring, and said bell housing of said outboard joint includes at least one window formed within said narrowed neck portion, said wheel end assembly further including a retaining clip inserted through said at least one window and engaging said notch of said inboard bearing ring to secure said bell housing to said inboard bearing ring.

15. The wheel end assembly of claim 10 wherein a notch extends circumferentially around a portion of said polygon shaped outer surface of said inboard bearing ring, and a groove extends around said bell housing inner surface, said wheel end assembly further including a retaining ring positioned within said groove within said bell housing, said retaining ring engaging said groove and said notch of said inboard bearing ring to secure said bell housing to said inboard bearing ring.

* * * * *

UNITED STATES PATENT AND TRADEMARK OFFICE
CERTIFICATE OF CORRECTION

PATENT NO. : 6,969,125 B2
DATED : November 29, 2005
INVENTOR(S) : Hui Hugh Wang et al.

It is certified that error appears in the above-identified patent and that said Letters Patent is hereby corrected as shown below:

Column 5,
Line 7, after "wheel end assembly" delete "." and substitute -- ; --.

Signed and Sealed this

Twenty-fifth Day of April, 2006

JON W. DUDAS
*Director of the United States Patent and Trademark Office*